United States Patent
Koo et al.

(10) Patent No.: US 10,351,067 B2
(45) Date of Patent: Jul. 16, 2019

(54) MOBILITY DEVICE STORAGE APPARATUS FOR VEHICLE

(71) Applicants: Hyundai Motor Company, Seoul (KR); Kia Motors Corp., Seoul (KR)

(72) Inventors: Dong Han Koo, Seoul (KR); Seok Won Lee, Uiwang Si (KR); Jae Young Choi, Seongnam-si (KR); Jun Hwan Park, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 96 days.

(21) Appl. No.: 15/789,148

(22) Filed: Oct. 20, 2017

(65) Prior Publication Data
US 2018/0186294 A1   Jul. 5, 2018

(30) Foreign Application Priority Data

Jan. 4, 2017   (KR) .................. 10-2017-0001534

(51) Int. Cl.
*B60R 7/04*   (2006.01)
*B60R 11/02*   (2006.01)
*B60R 11/00*   (2006.01)

(52) U.S. Cl.
CPC .............. *B60R 7/046* (2013.01); *B60R 11/02* (2013.01); *B60R 2011/0021* (2013.01); *B60R 2011/0087* (2013.01); *B60R 2011/0094* (2013.01)

(58) Field of Classification Search
CPC . B60R 7/046; B60R 11/00; B60R 2011/0021; B60R 2011/0042; B60R 2011/0049; B60R 2011/005; B60R 2011/008; B60R 2011/0082; B60R 2011/0085; B60R 2011/0087; B60R 2011/0094; B60R 13/0243
(Continued)

(56) References Cited

U.S. PATENT DOCUMENTS 5,800,004 A * 9/1998 Ackeret .................. B60R 7/046
                                                          224/915
5,996,954 A * 12/1999 Rosen ................ B60R 11/0235
                                                          248/278.1
(Continued)

FOREIGN PATENT DOCUMENTS

DE    102010054218 A1 *  8/2011  ............. B60K 37/04
FR       2907065 A3 *  4/2008  ............... A47C 7/70
(Continued)

*Primary Examiner* — Hilary L Gutman
(74) *Attorney, Agent, or Firm* — Morgan, Lewis & Bockius LLP

(57) ABSTRACT

A mobility device storage apparatus for a vehicle, may include a door having a storage space therein and a position releasing portion disposed in the storage space; and a tiltable storage device disposed in the storage space to be rotatable in a lateral direction, the tiltable storage device being tiltable in a vertical direction wherein a tilting motion of the tiltable storage device in the vertical direction is restricted by a tilting-up locking portion, wherein when the tiltable storage device is rotated in the lateral direction, the tilting-up locking portion is interlocked with the position releasing portion, wherein the tilting motion of the tiltable storage device in the vertical direction is unrestricted to allow the tiltable storage device to be tilted upward or downward.

18 Claims, 5 Drawing Sheets

(58) Field of Classification Search
USPC .................................................. 296/37.8, 152
See application file for complete search history.

(56) References Cited

U.S. PATENT DOCUMENTS

| | | | | |
|---|---|---|---|---|
| 6,179,263 | B1* | 1/2001 | Rosen | B60R 11/0235 |
| | | | | 248/278.1 |
| 7,249,795 | B1* | 7/2007 | Kellerman | A61G 21/00 |
| | | | | 296/16 |
| 7,328,825 | B2* | 2/2008 | Kaiser | B60R 7/046 |
| | | | | 220/8 |
| 7,641,252 | B2* | 1/2010 | Sturt | B60N 3/002 |
| | | | | 296/24.34 |
| 8,708,296 | B2* | 4/2014 | Nemoto | B60R 11/02 |
| | | | | 248/316.4 |
| 10,100,971 | B2* | 10/2018 | Yun | B60R 11/0241 |
| 2004/0061662 | A1* | 4/2004 | Yoshihara | B60R 11/0235 |
| | | | | 345/1.1 |
| 2005/0134074 | A1* | 6/2005 | Youngs | B60R 7/046 |
| | | | | 296/37.13 |
| 2017/0129413 | A1* | 5/2017 | Yu | F16M 11/14 |
| 2018/0186295 | A1* | 7/2018 | Akdag Cakir | B60R 7/046 |

FOREIGN PATENT DOCUMENTS

| | | | | |
|---|---|---|---|---|
| WO | WO-9915742 | A1* | 4/1999 | ......... B60R 11/0235 |
| WO | WO-2009020254 | A1* | 2/2009 | ......... B60R 11/0235 |

* cited by examiner

US 10,351,067 B2

MOBILITY DEVICE STORAGE APPARATUS FOR VEHICLE

CROSS-REFERENCE(S) TO RELATED APPLICATIONS

The present application claims priority to Korean Patent Application No. 10-2017-0001534, filed on Jan. 4, 2017, the entire contents of which is incorporated herein for all purposes by this reference.

BACKGROUND OF THE INVENTION

Field of the Invention

The present invention relates generally to a mobility device storage apparatus for a vehicle and, more particularly, to a mobility device storage apparatus for a vehicle that stores an electric personal mobility device therein.

Description of Related Art

Due to environmental pollution problems and an increase in leisure activities, the development of a single-person vehicle called a personal mobility device is increasing recently.

An example of an electric personal mobility device that uses a motor as a power source is a Segway and an electric kickboard.

An electric personal mobility device in a form of an electric kickboard is foldable to improve portability and is loaded in a back seat or a trunk compartment of a vehicle.

However, in the case of the electric personal mobility device, even when folded, the volume is large which causes a problem of occupying a large volume in the trunk compartment or in the back seat of a vehicle.

In addition, when the loaded electric personal mobility device is taken out of the vehicle, inconvenience occurs because a user has to bend at the waist to take out the heavy electric personal mobility device.

The information disclosed in this Background of the Invention section is only for enhancement of understanding of the general background of the invention, and should not be taken as an acknowledgment or any form of suggestion that this information forms the prior art already known to a person skilled in the art.

BRIEF SUMMARY

Various aspects of the present invention are directed to providing a mobility device storage apparatus for a vehicle, wherein a problem of limiting an internal volume of a vehicle is solved by storing an electric personal mobility device in a vehicle door, and user convenience is improved by facilitating easy removal of the electric personal mobility device from the vehicle door.

According to various aspects of According to various aspects of the present invention, there is provided a mobility device storage apparatus for a vehicle, the apparatus including: a door having a storage space therein and a position releasing portion disposed in the storage space; and a tiltable storage device disposed in the storage space configured to be rotatable in a lateral direction, the tiltable storage device being tiltable in a vertical direction wherein a tilting motion of the tiltable storage device in the vertical direction is restricted by a tilting-up locking portion, wherein when the tiltable storage device is rotated in the lateral direction, the tilting-up locking portion is interlocked with the position releasing portion, wherein the tilting motion of the tiltable storage device in the vertical direction is restricted to allow the tiltable storage device to be tilted upward or downward.

The storage space may be formed by being recessed in the door, and is provided at a side thereof with the position releasing portion and the tiltable storage device wherein the tiltable storage device is rotatable in the lateral direction thereof.

The tiltable storage device may include: a rotation shaft provided in the storage space configured to be rotatable in the lateral direction; and a tilting portion disposed on the rotation shaft configured to be tiltable in the vertical direction and loaded with the mobility device, wherein a tilting motion of the tilting portion in the vertical direction is restricted by the tilting-up locking portion.

The storage space may be provided with a first torsion spring connected to the rotation shaft wherein the tilting portion is rotated with the rotation shaft in the lateral direction by an elastic force of the first torsion spring.

The tilting portion may include: a mobility device holding portion configured to enclose the mobility device together with the storage space; and a guide portion configured to be rotated with the rotation shaft, and provided wherein the mobility device holding portion is tilted in the vertical direction, and wherein tilting motions of the mobility device holding portion and the guide portion in the vertical direction are restricted by the tilting-up locking portion.

The guide portion may be provided with a locking hole, and the mobility device holding portion may be provided with a fixing hole corresponding to the locking hole, wherein the tilting-up locking portion is provided in the fixing hole to be elastically biased and is inserted into the locking hole, wherein the tilting motion of the mobility device holding portion at the guide portion is restricted.

The tilting-up locking portion may be provided in a pin shape and may be elastically biased by an elastic spring in the fixing hole, and the position releasing portion may be provided in a pin shape and may be disposed wherein when the tiltable storage device is rotated in the lateral direction, the position releasing portion corresponds to the tilting-up locking portion.

The position releasing portion may be provided with a chamfered portion at an end portion thereof where the position releasing portion is brought into contact with the tilting-up locking portion, wherein when the tiltable storage device is rotated in the lateral direction, the position releasing portion is inserted to the locking hole.

The guide portion may be provided with a hinge portion circumferentially extending in a direction in which the mobility device holding portion is tilted, with the mobility device holding portion being tiltably coupled to the hinge portion.

The mobility device holding portion may be provided with a tiltable portion configured to contact a surface of the guide portion and tiltably connected to the hinge portion.

The hinge portion of the guide portion may be provided with a second torsion spring connected to the tiltable portion of the mobility device holding portion wherein the mobility device holding portion is tilted in the vertical direction by an elastic force of the second torsion spring.

The guide portion may be provided with an extension groove extending circumferentially by a predetermined distance on a surface of the guide portion facing the mobility device holding portion, wherein when the tilting-up locking portion is separated from the locking hole, movement of the tilting-up locking portion is limited to a distance in which the first protrusion is formed.

The tiltable storage device may be provided with a position locking end portion having a latch groove, and the storage space may be provided with a latch mechanism locked into the latch groove and restricting a rotation of the tiltable storage device.

Meanwhile, according to various aspects of the present invention, there is provided a mobility device storage apparatus for a vehicle, the apparatus including: a door having a storage space therein, with a position releasing portion disposed in the storage space; a rotation shaft disposed in the storage space to be rotatable in a lateral direction; and a tilting portion disposed on the rotation shaft to be tiltable in a vertical direction and configured to hold the mobility device therein, wherein a tilting motion of the tilting portion in the vertical direction is restricted by a tilting-up locking portion, the tilting portion including: a mobility device holding portion configured to hold the mobility device; and a guide portion disposed on the rotation shaft wherein the mobility device holding portion is tiltable in the vertical direction, wherein the mobility device holding portion and the guide portion are connected to each other by the tilting-up locking portion, wherein a tilting motion of the mobility device holding portion is restricted, and when the tilting portion is rotated in the lateral direction, the tilting-up locking portion is released from locking by the position releasing portion wherein the mobility device holding portion is tilted in the vertical direction thereof.

The guide portion may be provided with a locking hole, and the mobility device holding portion may be provided with a fixing hole corresponding to the locking hole, wherein the tilting-up locking portion is elastically biased in the fixing hole and is inserted into the locking hole, wherein the tilting motion of the mobility device holding portion is restricted at the guide portion.

The tilting-up locking portion may be formed in a pin shape and may be elastically biased by an elastic spring in the fixing hole, and the position releasing portion may be formed in a pin shape and may be disposed wherein when the tilting portion is rotated in the lateral direction, the position releasing portion corresponds to the tilting-up locking portion.

The guide portion may be circumferentially formed by extending along a direction in which the mobility device holding portion is tilted, and may include a hinge portion to which the mobility device holding portion is tiltably coupled.

The mobility device holding portion may be provided with a tiltable portion configured to contact a surface of the guide portion and tiltably connected to the hinge portion.

According to the mobility device storage apparatus for the vehicle having the above-mentioned configuration, since the electric personal mobility device is stored in the door of the vehicle, the problem of limiting the internal volume of the vehicle can be solved.

In addition, the electric personal mobility device can be taken out directly from the door of the vehicle, and the tilted state of the mobility device is maintained wherein the mobility device can be easily taken out, improving user convenience.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
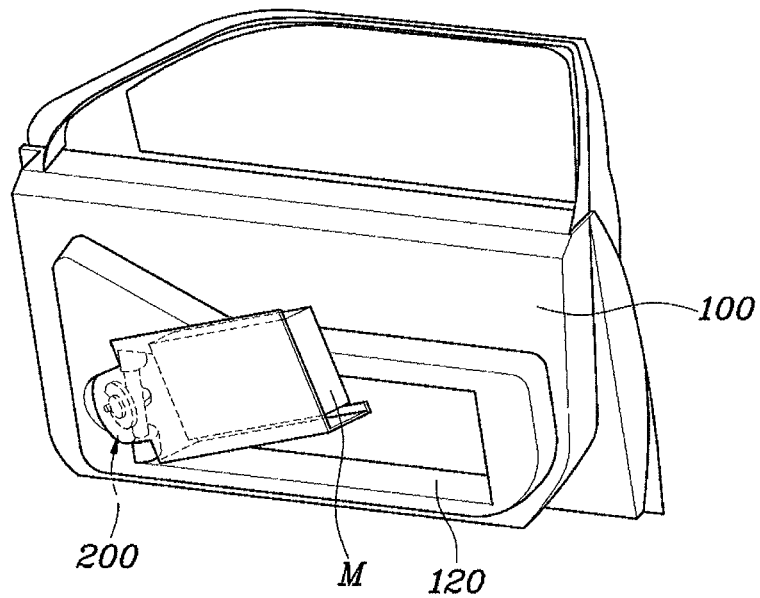
FIG. 1 is a view showing a mobility device storage apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 8:
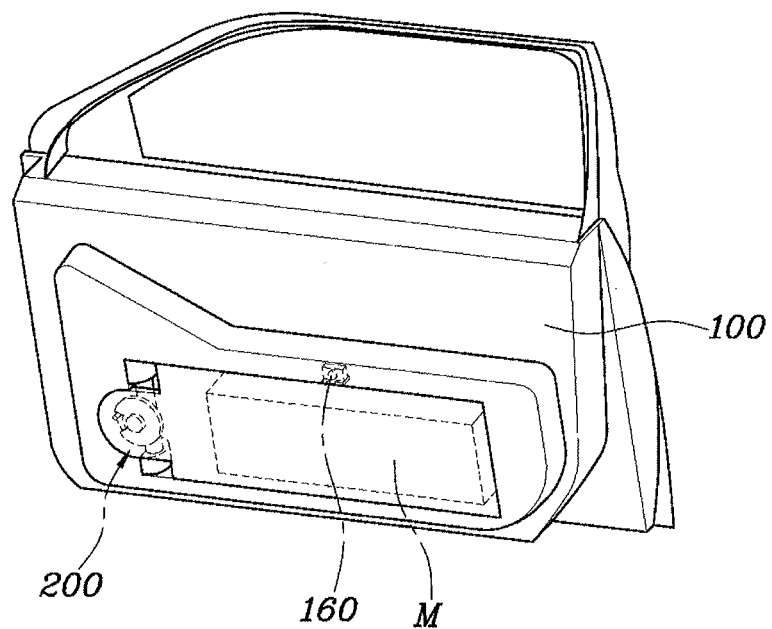
FIG. 8 and FIG. 9 are views showing an operation state of the mobility device storage apparatus for the vehicle shown in FIG. 1.
Figure 9:
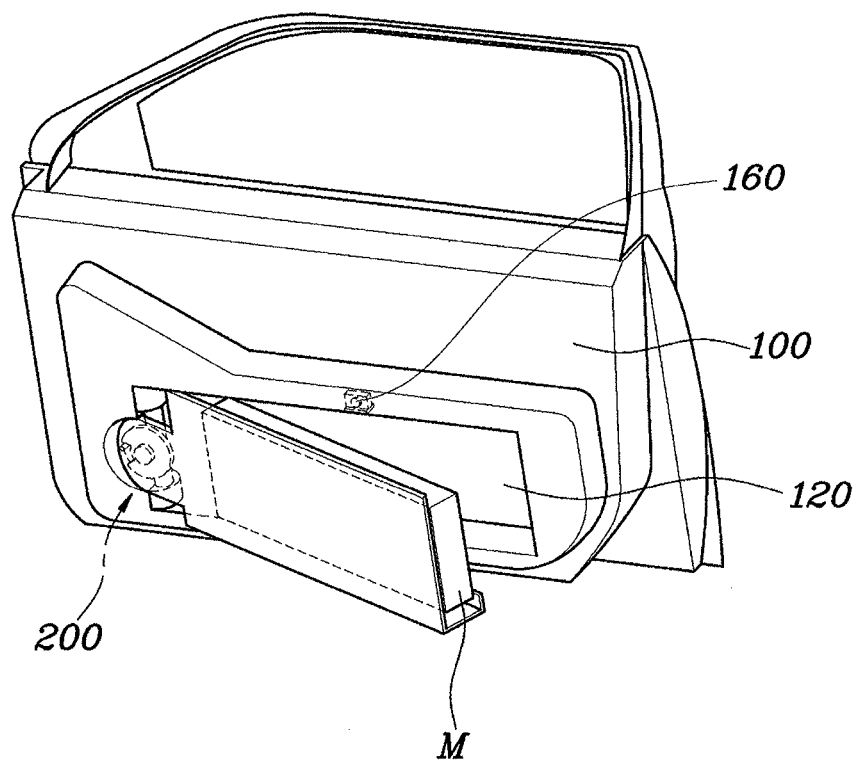

FIG. 1 is a view showing a mobility device storage apparatus for a vehicle according to an exemplary embodiment of the present invention, FIG. 2 to FIG. 7 are views showing the mobility device storage apparatus for the vehicle shown in FIG. 1, and FIG. 8 to FIG. 9 are views showing an operation state of the mobility device storage apparatus for the vehicle shown in FIG. 1.

The mobility device of the present invention is an electric personal mobility device (hereinafter referred to as mobility device) and refers to, for example, a one-wheel or two-wheel electric board. In other words, according to an exemplary embodiment of the present invention, it is possible to store various types of mobility devices M without being limited to a kickboard type. In addition, according to the type of the mobility device, shapes of a storage space 120 and a mobility device holding portion 262 that will be described later may be provided correspondingly to the shape of the mobility device M, wherein various types of mobility devices M can be stored.

As shown in FIG. 1, a mobility device storage apparatus for a vehicle according to an exemplary embodiment of the present invention may include a door 100 having a storage space 120 therein and a position releasing portion 140 provided in the storage space 120; and a tiltable storage device 200 provided in the storage space 120 to be rotatable in a lateral direction, the tiltable storage device being tiltable in a vertical direction wherein a tilting motion of the tiltable storage device 200 in the vertical direction is restricted by a tilting-up locking portion 220, wherein when the tiltable storage device 200 is rotated in the lateral direction, the tilting-up locking portion 220 is interlocked with the position releasing portion 140 wherein the tilting motion of the tiltable storage device 200 in the vertical direction is unrestricted to allow the tiltable storage device to be tilted upward.

As described above, according to an exemplary embodiment of the present invention, since the storage space 120 is provided in the door 100, a user can take the mobility device M out of the door 100 conveniently upon exiting the vehicle. Further, since the door 100 is used as a loading space, occupation of an internal volume and a trunk compartment by the mobility device can be minimized. The storage space 120 of the door 100 is provided with the position releasing portion 140 for allowing the tiltable storage device 200 to be rotated in the vertical direction thereof.

The tiltable storage device 200 is loaded with the mobility device M, and is disposed in the storage space 120 to be rotatable in the lateral direction thereof. The tiltable storage device 200 may be tilted in the vertical direction in a state of being rotated in the lateral direction thereof. In other words, the tiltable storage device 200 is maintained in a state in which a tilting motion of the tiltable storage device 200 in the vertical direction is restricted by a tilting-up locking portion 220. When the tiltable storage device 200 is completely drawn out of the storage space 120 by being rotated in the lateral direction, the locking of the tilting-up locking portion 220 is released by the position releasing portion 140 provided in the storage space 120, allowing the tiltable storage device 200 to be tilted in the vertical direction thereof.

As a result, the tiltable storage device 200 is rotated in the lateral direction to be drawn out of the storage space 120, and then when completely drawn out, the vertical tilting of the tiltable storage device 200 is allowed as the locking of the tilting-up locking portion 220 is released by the position releasing portion 140, and thus the tiltable storage device 200 is tilted upward. Accordingly, as shown in FIG. 1, the tiltable storage device 200 is in the drawn-out and lifted state, wherein a user can easily take out the mobility device M without bending at the user's waist.

As shown in FIG. 1, the storage space 120 is formed by being recessed in the door 100. The storage space 120 is provided at an end portion of a side thereof with the position releasing portion 140 and the tiltable storage device 200 wherein the tiltable storage device 200 is rotatable in the lateral direction thereof.

In other words, since the storage space 120 is provided in the door 100, a user can conveniently take out the mobility device M loaded in the tiltable storage device 200 by opening the door 100 upon exiting the vehicle. In addition, the tiltable storage device 200 may be rotatably provided at the end portion of the side of the storage space 120, wherein the side may be an internal side of the door 100. Accordingly, the tiltable storage device 200 is positioned wherein the mobility device M loaded in the tiltable storage device 200 can be easily taken out in a state where the door 100 is opened, improving user convenience.

Explained in detail with reference to FIG. 2 and FIG. 3, the tiltable storage device 200 includes a rotation shaft 240 rotatably disposed in the storage space 120; and a tilting portion 260 provided on the rotation shaft 240 to be tiltable in a vertical direction and configured to hold the mobility device M, wherein a tilting motion of the tilting portion 260 in the vertical direction is restricted by the tilting-up locking portion 220.

Here, the storage space 120 is provided with a first torsion spring S1 connected to the rotation shaft 240 wherein the tilting portion 260 together with the rotation shaft 240 can be rotated in the lateral direction by an elastic force of the first torsion spring S1.

As described above, the tiltable storage device 200 includes the rotation shaft 240 and the tilting portion 260. The rotation shaft 240 is connected to the first torsion spring S1 disposed in the storage space 120, and is rotated by the elastic force of the first torsion spring S1 in a direction in which the tiltable storage device 200 is drawn out of the storage space 120. Accordingly, the tilting portion 260 provided on the rotation shaft 240 can be automatically rotated in the lateral direction to be drawn out of the storage space 120.

In addition, the tiltable storage device 200 may be provided with a position locking end portion 280 having a latch groove 282. The storage space 120 may be provided with a latch mechanism 160 locked into the latch groove 282 and restricting a rotation of the tiltable storage device 200. As shown in FIG. 2 to FIG. 7, the tiltable storage device 200 is provided with the position locking end portion 280 wherein when the position locking end portion 280 is engaged with the latch mechanism 160 provided in the storage space 120, the rotation of the tiltable storage device 200 is restricted in the storage space 120, being maintained in a retracted state. In other words, when the latch mechanism 160 is released, the tiltable storage device 200 is allowed to be rotated, and then the tiltable storage device 200 is automatically rotated by the elastic force of the first torsion spring S1, being drawn out of the storage space 120. Here, the position locking end portion 280 and the latch mechanism 160 may use a well-known latch structure, and various locking structures including a push latch may be selectively used.

As described above, the tilting portion 260 is rotated in the lateral direction by the elastic force of the first torsion spring S1 about the rotation shaft 240, and is tiltable in the vertical direction on the rotation shaft 240. However, the tilting portion 260 is allowed to be tilted upward after being rotated in the lateral direction, so the tilting motion of the tilting portion 260 in the vertical direction is restricted by the tilting-up locking portion 220. An unlocking operation of the tilting-up locking portion 220 will be described in detail later.

Figure 2:
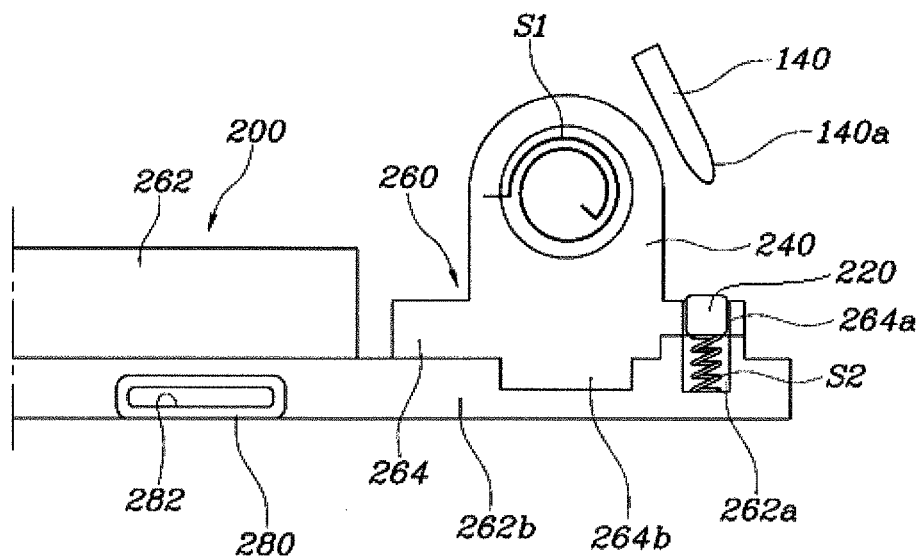
FIG. 2, FIG. 3, FIG. 4, FIG. 5, FIG. 6, and FIG. 7 are views showing the mobility device storage apparatus for the vehicle shown in FIG. 1.
Figure 3:
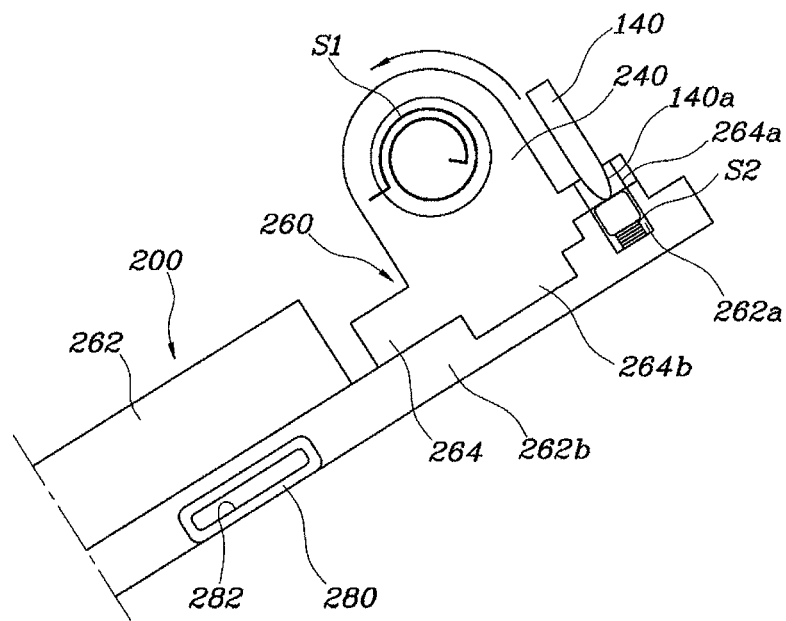

Explained in detail, the tilting portion 260, as shown in FIG. 1 to FIG. 3, includes a mobility device holding portion 262 configured to enclose the mobility device M together with the storage space 120; and a guide portion 264 configured to be rotated with the rotation shaft 240 and provided wherein the mobility device holding portion 262 is tilted in the vertical direction, wherein tilting motions of the mobility device holding portion 262 and the guide portion 264 in the vertical direction may be restricted by the tilting-up locking portion 220.

As described above, the tilting portion 260 includes the mobility device holding portion 262 and the guide portion 264. The mobility device holding portion 262 may be formed in an V-shape wherein the mobility device holding portion 262 supports the mobility device M and encloses the mobility device M together with the storage space 120. The guide portion 264 is disposed on the rotation shaft 240 and configured to be rotated in the lateral direction together with the rotation shaft 240, and is provided wherein the mobility device holding portion 262 is tilted in the vertical direction thereof. Here, the mobility device holding portion 262 and the guide portion 264 are connected to each other by the tilting-up locking portion 220 wherein the tilting motions thereof in the vertical direction are restricted by the tilting-up locking portion 220, and when the tilting-up locking portion 220 is separated from the mobility device holding portion 262 or the guide portion 264, the mobility device holding portion 262 can be tilted at the guide portion 264.

As shown in FIG. 2 to FIG. 3, the guide portion 264 is provided with a locking hole 264a, and the mobility device holding portion 262 is provided with a fixing hole 262a corresponding to the locking hole 264a. The tilting-up locking portion 220 is elastically biased in the fixing hole 262a and is inserted into the locking hole 264a, wherein the tilting motion of the mobility device holding portion 262 at the guide portion 264 is restricted.

Here, as shown in FIG. 3, the tilting-up locking portion 220 is formed in a pin shape and is elastically biased by an elastic spring S2 in the fixing hole 262a, and the position releasing portion 140 is formed in a pin shape and is placed wherein when the tiltable storage device 200 is rotated in the lateral direction, the position releasing portion 140 corresponds to the tilting-up locking portion 220.

As described above, the locking hole 264a and the fixing hole 262a are respectively formed on surfaces where the guide portion 264 and the mobility device holding portion 262 face to each other. The tilting-up locking portion 220 is elastically biased in the fixing hole 262a of the mobility device holding portion 262, and the tilting-up locking portion 220 is inserted into the locking hole 264a, maintaining a locked state in which the mobility device holding portion 262 is restricted from being tilted at the guide portion 264. As shown in FIG. 2, the tilting-up locking portion 220 elastically biased by the elastic spring S2 in the fixing hole 262a of the mobility device holding portion 262 is inserted into the locking hole 264a of the guide portion 264, restricting the tilting motion of the mobility device holding portion 262 at the guide portion 264.

Figure 4:
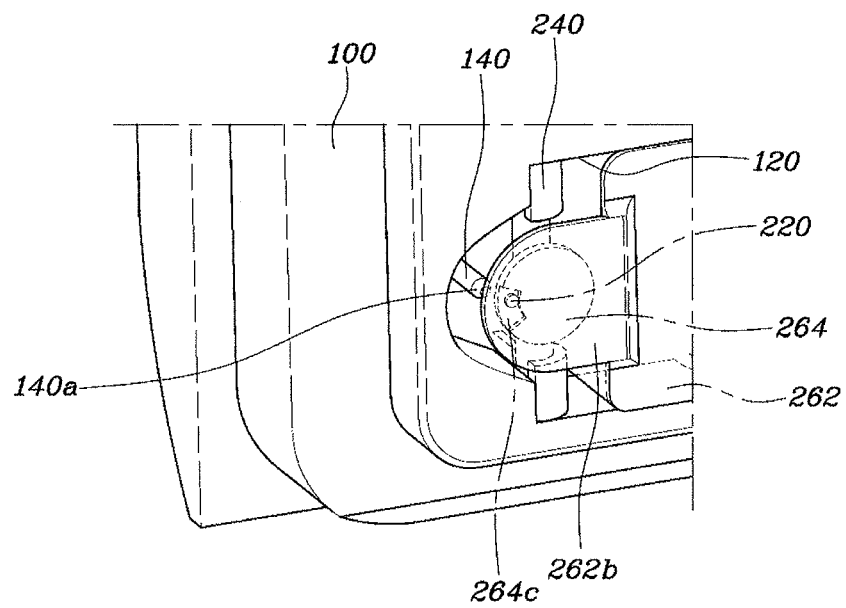

As shown in FIG. 4, the position releasing portion 140 for releasing locking of the tilting-up locking portion 220 is placed wherein when the tiltable storage device 200 is rotated in the lateral direction, the tiltable storage device 200 is brought into contact with the tilting-up locking portion 220. In other words, when the guide portion 264 of the tiltable storage device 200 is rotated with the rotation shaft 240, the mobility device holding portion 262 is rotated with the guide portion 264. Accordingly, when the mobility device holding portion 262 is laterally rotated about the rotation shaft 240 wherein the tilting-up locking portion 220 disposed in the fixing hole 262a of the mobility device holding portion 262 is brought into contact with the position releasing portion 140, the pin-shaped position releasing portion 140 pushes the pin-shaped tilting-up locking portion 220. Accordingly, the tilting-up locking portion 220 is pushed while compressing the elastic spring S2 and then is released from the locking hole 264a of the guide portion 264, being released from a locked state. Thus, the mobility device holding portion 262 is allowed to be tiltable, being tilted upward.

The position releasing portion 140 is provided with a chamfered portion 140a at an end portion of the position releasing portion 140 where the position releasing portion 140 is brought into contact with the tilting-up locking portion 220, wherein when the tiltable storage device 200 is rotated in the lateral direction, the position releasing portion 140 is inserted to the locking hole 264a. In other words, as the tilting portion 260 of the tiltable storage device 200 is rotated in the lateral direction, the position releasing portion 140 is brought into contact with the tilting-up locking portion 220 passing through the mobility device holding portion 262 and the guide portion 264. Here, when the position releasing portion 140 is inserted to the fixing hole 262a provided at the mobility device holding portion 262 by passing through the locking hole 264a provided at the guide portion 264 while pressing the tilting-up locking portion 220, the mobility device holding portion 262 and the guide portion 264 may be in the locked state again by the position releasing portion 140.

Thus, by providing the chamfered portion 140a at the end portion of the position releasing portion 140, the position releasing portion 140 can be inserted to the locking hole 264a of the guide portion 264, efficiently releasing the locking of the tilting-up locking portion 220.

Meanwhile, the tilting motion of the mobility device holding portion 262 in the vertical direction will be described in detail. The guide portion 264 may be provided with a hinge portion 264b circumferentially extending in a direction in which the mobility device holding portion 262 is tilted, with the mobility device holding portion 262 being tiltably coupled to the hinge portion 264b.

The mobility device holding portion 262 may be provided with a tiltable portion 262b configured to be in contact with a surface of the guide portion 264 and tiltably connected to the hinge portion 264b.

Referring to FIG. 2 to FIG. 8, the guide portion 264 may be formed in a disc shape by circumferentially extending in the direction in which the mobility device holding portion 262 is tilted, and the hinge portion 264b may protrude from a center of the guide portion 264 wherein the tiltable portion 262b of the mobility device holding portion 262 is tiltable through the hinge portion 264b. Here, the tiltable portion 262b of the mobility device holding portion 262 may be tiltably coupled to the hinge portion 264b of the guide portion 264. The guide portion 264 may be formed in various shapes without being limited to the disc shape, and the hinge portion 264b may be formed in a circular shape wherein the mobility device holding portion 262 can be in the vertical direction on the hinge portion 264b.

In addition, the hinge portion 264b of the guide portion 264 is disposed with a second torsion spring S3 connected to the tiltable portion 262b of the mobility device holding portion 262 wherein the mobility device holding portion 262b can be tilted in the vertical direction by an elastic force of the second torsion spring S3. Here, the second torsion spring S3 may be provided at the guide portion 264 without being limited to the hinge portion 264b.

Accordingly, the mobility device holding portion 262 is automatically tilted in the vertical direction by the elastic force of the second torsion spring S3, and thus when the tiltable storage device 200 is rotated in the lateral direction to be drawn out of the storage space 120, and accordingly the tilting-up locking portion 220 is pushed by the position releasing portion 140 to be released from the locked state, the mobility device holding portion 262 can be automatically tilted upward by receiving the elastic force of the second torsion spring S3.

Figure 5:
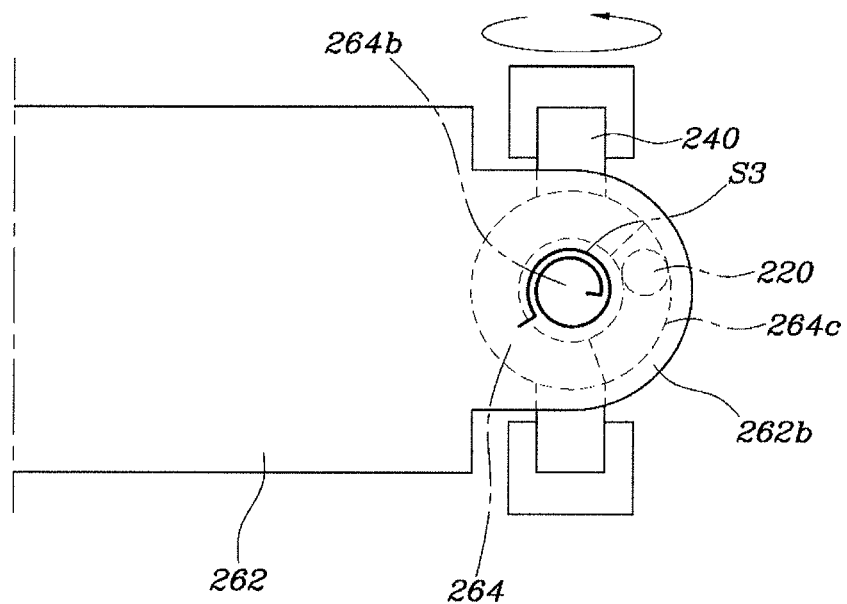
Figure 6:
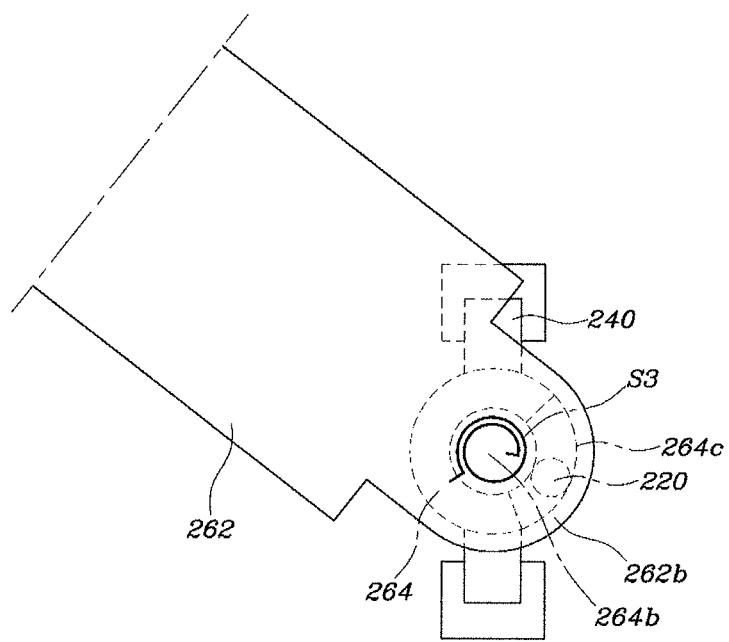
Figure 7:
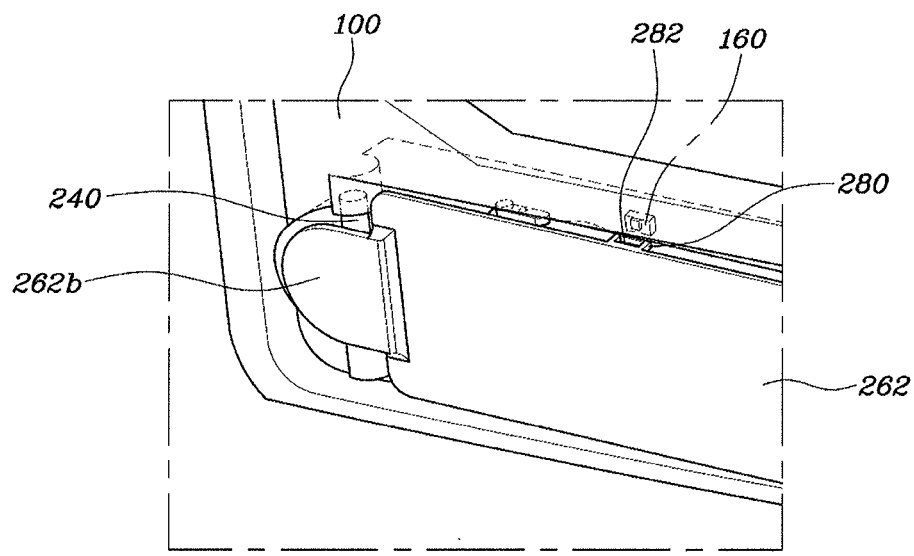

As a result, when the tiltable storage device 200 is allowed to be rotated in the lateral direction through the operation of the latch mechanism 160, the tiltable storage device 200 is drawn out of the storage space 120 by the first torsion spring S1. As such, when the tiltable storage device 200 is completely drawn out, the position releasing portion 140 releases the locking of the tilting-up locking portion 220, and thus the tiltable storage device 200 can be tilted upward.

as shown in FIG. 4, FIG. 5, and FIG. 6, the guide portion 264 is provided with an extension groove 264c extending circumferentially by a predetermined distance on a surface of the guide portion 264 and facing the mobility device holding portion 262, wherein when the tilting-up locking portion 220 is separated from the locking hole 264a, movement of the tilting-up locking portion 220 can be limited to the distance in which the extension groove 264c is formed.

As shown in FIG. 4, the extension groove 264c is provided at the guide portion 264 by extending circumferentially by the predetermined distance along the direction in which the mobility device holding portion 262 is tilted, and the locking hole 264a is formed on the extension groove 264c.

The extension groove 264c is configured for restricting the tilting motion of the mobility device holding portion 262 in the vertical direction by the predetermined distance, wherein when the tilting-up locking portion 220 is brought into contact with the position releasing portion 140 as the tiltable storage device 200 is rotated, the tilting-up locking portion 220 is pushed by the position releasing portion 140 to be separated from the locking hole 264a. Accordingly, the tilting-up locking portion 220 of the mobility device holding portion 262 is positioned on the extension groove 264c in the separated state, and the mobility device holding portion 262 is allowed to be tiltable, being tilted upward. Here, as shown in FIG. 5 and FIG. 6, when the mobility device holding portion 262 is tilted, the tilting-up locking portion 220 is moved along the extension groove 264c, and then when the tilting-up locking portion 220 is brought into contact with an end portion of the extension groove 264c, the tilting motion of the mobility device holding portion 262 is restricted.

As described above, when the tiltable storage device 200 is rotated laterally, a tilting position of the tiltable storage device 200 is determined by the position releasing portion 140, and when the tiltable storage device 200 is tilted upward, the tilting position thereof is determined by the extension groove 264c, determining a final position of the tiltable storage device 200.

The operation of the present invention will be now described. As shown in FIG. 8, the tiltable storage device 200 is placed in the storage space 120 of the door 100, wherein the mobility device M is in a loaded state, and then as shown in FIG. 9 when the tiltable storage device 200 is allowed to be drawn out by the operation of the latch mechanism 160, the tiltable storage device 200 is rotated in the lateral direction by the elastic force of the first torsion spring S1.

When the tiltable storage device 200 is completely rotated in the lateral direction by being drawn out of the storage space 120, the tilting-up locking portion 220 of the tiltable storage device 200 is released from being locked by the position releasing portion 140, whereafter the tiltable storage device 200 is allowed to be tilted in the vertical direction, being tilted upward as shown in FIG. 1.

A mobility device M storage apparatus according to an exemplary embodiment of the present invention may include a door 100 having a storage space 120 therein, with a position releasing portion 140 provided in the storage space 120; a rotation shaft 240 disposed in the storage space 120 to be rotatable in a lateral direction; and a tilting portion 260 disposed on the rotation shaft 240 to be tiltable in a vertical direction and configured to hold the mobility device M, wherein a tilting motion of the tilting portion 260 in the vertical direction is restricted by a tilting-up locking portion 220, the tilting portion 260 including: a mobility device holding portion 262 holding the mobility device M and a guide portion 264 disposed on the rotation shaft 240 wherein the mobility device holding portion 262 is tiltable in the vertical direction thereof. Here, the mobility device holding portion 262 and the guide portion 264 are connected to each other by the tilting-up locking portion 220, wherein a tilting motion of the mobility device holding portion 262 is restricted, and when the tilting portion 260 is rotated in the lateral direction, the tilting-up locking portion 220 is released from being locked by the position releasing portion 140 wherein the mobility device holding portion 262 is tilted in the vertical direction thereof.

Here, the guide portion 264 may be provided with a locking hole 264a, and the mobility device holding portion 262 may be provided with a fixing hole 262a corresponding to the locking hole 264a. The tilting-up locking portion 220 may be elastically biased in the fixing hole 262a and is inserted into the locking hole 264a, wherein the tilting motion of the mobility device holding portion 262 is restricted at the guide portion 264. The tilting-up locking portion 220 may be formed in a pin-shape and may be elastically biased in the fixing hole 262a by an elastic spring S2, and the position releasing portion 140 may be formed in a pin-shape and may be disposed wherein when the tilting portion 260 is rotated in the lateral direction, the position releasing portion 140 corresponds to the tilting-up locking portion 220.

Meanwhile, the guide portion 264 may be circumferentially formed by extending along a direction in which the mobility device holding portion 262 is tilted, and may include a hinge portion 264b to which the mobility device holding portion 262 is tiltably coupled. Accordingly, the mobility device holding portion 262 may be provided with a tiltable portion 262b configured to be in contact with a surface of the guide portion 264 and tiltably connected to the hinge portion 264b.

As a result, the tiltable storage device 200 is placed in the storage space 120 of the door 100, wherein the mobility device M is in the loaded state. As such, when a tilting motion of the tiltable storage device 200 is allowed wherein the tiltable storage device 200 is drawn out of the storage space 120, the tilting-up locking portion 220 of the tiltable storage device 200 is released from being locked by the position releasing portion 140, and thus the tiltable storage device 200 is allowed to be tilted in the vertical direction, being tilted upward.

According to the mobility device storage apparatus for a vehicle having the above-described structure, the problem of limiting the internal volume or the trunk compartment of the vehicle can be solved by storing the electric personal mobility device in the door 100 of the vehicle.

In addition, the electric personal mobility device can be taken out directly from the door 100 of the vehicle, and the mobility device is positioned wherein the mobility device can be easily taken out, improving user convenience.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mobility device storage apparatus for a vehicle, the apparatus comprising:
    a door having a storage space therein and a position releasing portion disposed in the storage space; and
    a tiltable storage device disposed in the storage space to be rotatable in a lateral direction thereof, the tiltable storage device being tiltable in a vertical direction thereof wherein a tilting motion of the tiltable storage device in the vertical direction is restricted by a tilting-up locking portion, wherein, when the tiltable storage device is rotated in the lateral direction, the tilting-up locking portion is interlocked with the position releasing portion, and wherein the tilting motion of the tiltable storage device in the vertical direction is unrestricted to allow the tiltable storage device to be tilted upward or downward therefrom.

2. The apparatus of claim 1, wherein the storage space is formed by being recessed in the door, and is provided at a side thereof with the position releasing portion and the tiltable storage device, and wherein the tiltable storage device is rotatable in the lateral direction thereof.

3. The apparatus of claim 1, wherein the tiltable storage device includes:
    a rotation shaft disposed in the storage space to be rotatable in the lateral direction; and
    a tilting portion disposed on the rotation shaft to be tiltable in the vertical direction and loaded with a mobility device, wherein a tilting motion of the tilting portion in the vertical direction is restricted by the tilting-up locking portion.

4. The apparatus of claim 3, wherein the storage space is provided with a first torsion spring connected to the rotation shaft, and wherein the tilting portion is rotated with the rotation shaft in the lateral direction by an elastic force of the first torsion spring.

5. The apparatus of claim 3, wherein the tilting portion includes:
    a mobility device holding portion configured to enclose the mobility device together with the storage space; and
    a guide portion provided to be rotated with the rotation shaft, and provided such that the mobility device holding portion is tilted in the vertical direction,
    wherein tilting motions of the mobility device holding portion and the guide portion in the vertical direction are restricted by the tilting-up locking portion.

6. The apparatus of claim 5, wherein the guide portion is provided with a locking hole, and the mobility device holding portion is provided with a fixing hole corresponding to the locking hole,
    wherein the tilting-up locking portion is disposed in the fixing hole to be elastically biased and is inserted into the locking hole, and wherein the tilting motion of the mobility device holding portion at the guide portion is restricted.

7. The apparatus of claim 6, wherein the tilting-up locking portion is provided in a pin shape and is elastically biased by an elastic spring in the fixing hole, and
    the position releasing portion is provided in a pin shape and is disposed, such that, when the tiltable storage device is rotated in the lateral direction, the position releasing portion corresponds to the tilting-up locking portion.

8. The apparatus of claim 6, wherein the position releasing portion is provided with a chamfered portion at an end portion thereof such that the position releasing portion is brought into contact with the tilting-up locking portion, and wherein, when the tiltable storage device is rotated in the lateral direction, the position releasing portion is inserted to the locking hole.

9. The apparatus of claim 6, wherein the guide portion is provided with a hinge portion circumferentially extending in a direction in which the mobility device holding portion is tilted, with the mobility device holding portion being tiltably coupled to the hinge portion.

10. The apparatus of claim 9, wherein the mobility device holding portion is provided with a tiltable portion configured to be in contact with a surface of the guide portion and tiltably connected to the hinge portion.

11. The apparatus of claim 10, wherein the hinge portion of the guide portion is provided with a second torsion spring connected to the tiltable portion of the mobility device holding portion such that the mobility device holding portion is tilted in the vertical direction by an elastic force of the second torsion spring.

12. The apparatus of claim 9, wherein the guide portion is provided with an extension groove extending circumferentially by a predetermined distance on a surface of the guide portion facing the mobility device holding portion, such that, when the tilting-up locking portion is separated from the locking hole, movement of the tilting-up locking portion is limited to the distance in which the first protrusion is formed.

13. The apparatus of claim 1, wherein the tiltable storage device is provided with a position locking end portion having a latch groove, and
    the storage space is provided with a latch mechanism locked into the latch groove and restricting a rotation of the tiltable storage device.

14. A mobility device storage apparatus for a vehicle, the apparatus comprising:
    a door having a storage space therein, with a position releasing portion disposed in the storage space;
    a rotation shaft disposed in the storage space to be rotatable in a lateral direction thereof; and
    a tilting portion disposed on the rotation shaft to be tiltable in a vertical direction thereof and configured to hold a mobility device therein, wherein a tilting motion of the tilting portion in the vertical direction is restricted by a tilting-up locking portion, the tilting portion including: a mobility device holding portion holding the mobility device; and a guide portion disposed on the rotation shaft, and wherein the mobility device holding portion is tiltable in the vertical direction,
    wherein the mobility device holding portion and the guide portion are connected to each other by the tilting-up locking portion such that a tilting motion of the mobility device holding portion is restricted, and when the tilting portion is rotated in the lateral direction, the tilting-up locking portion is released from locking by the position releasing portion such that the mobility device holding portion is tilted in the vertical direction thereof.

15. The apparatus of claim 14, wherein the guide portion is provided with a locking hole, and the mobility device holding portion is provided with a fixing hole corresponding to the locking hole, wherein the tilting-up locking portion is elastically biased in the fixing hole and is inserted into the locking hole, such that the tilting motion of the mobility device holding portion is restricted at the guide portion.

16. The apparatus of claim 15, wherein the tilting-up locking portion is formed in a pin-shape and is elastically biased by an elastic spring in the fixing hole, and the position releasing portion is formed in a pin-shape and is disposed such that, when the tilting portion is rotated in the lateral direction, the position releasing portion corresponds to the tilting-up locking portion.

17. The apparatus of claim 15, wherein the guide portion is circumferentially formed by extending along a direction in which the mobility device holding portion is tilted, and includes a hinge portion to which the mobility device holding portion is tiltably coupled.

18. The apparatus of claim 17, wherein the mobility device holding portion is provided with a tiltable portion configured to be in contact with a surface of the guide portion and tiltably connected to the hinge portion.

* * * * *